Patented Mar. 6, 1945

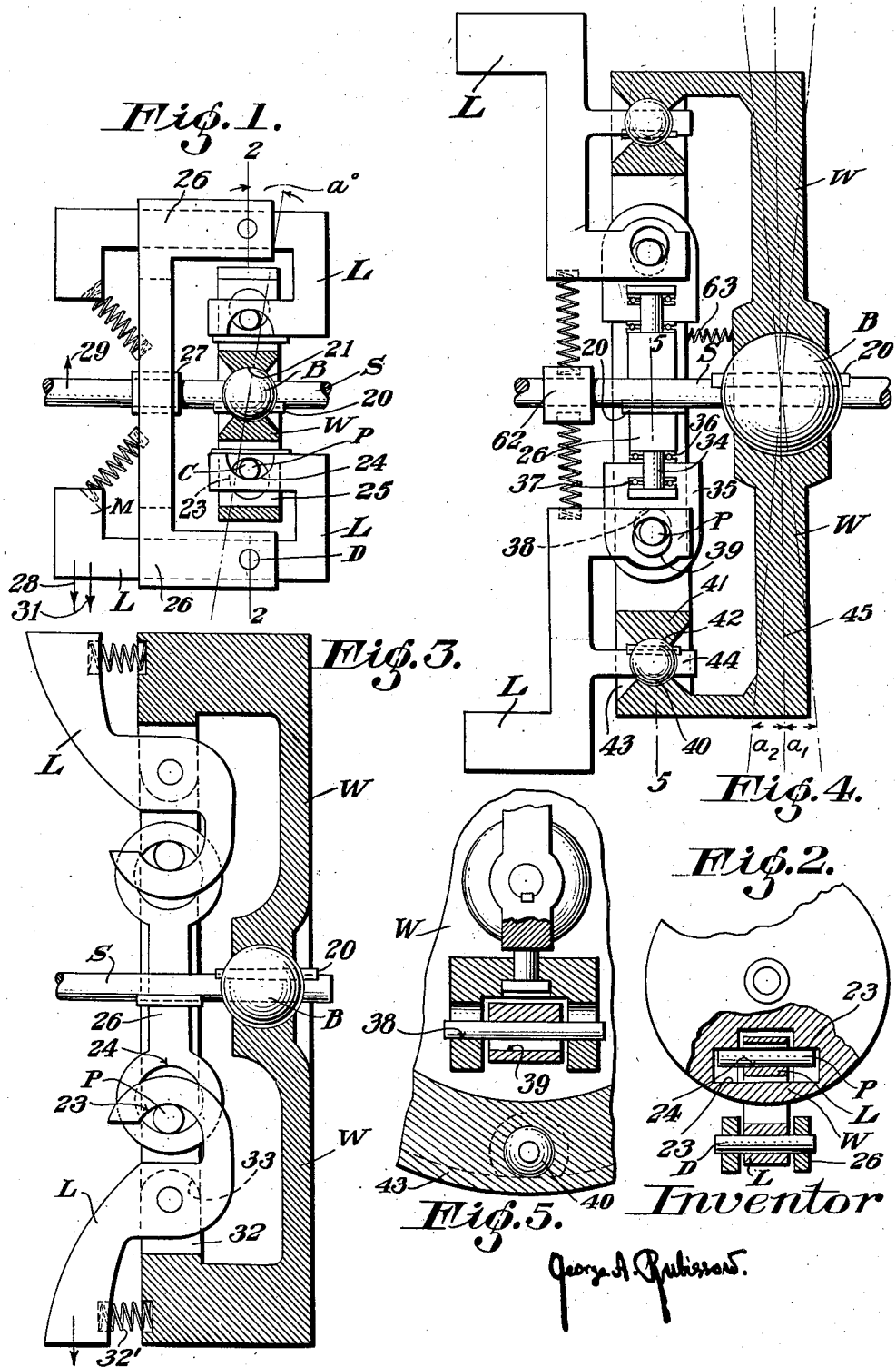

2,370,880

UNITED STATES PATENT OFFICE 2,370,880

DAMPER FOR FLEXIONAL VIBRATIONS

George A. Rubissow, New York, N. Y.

Application October 25, 1941, Serial No. 416,487

4 Claims. (Cl. 74—574)

This invention provides a device for dampening lateral flexional vibrations in a shaft and in the rotating parts affixed thereto.

The above and further objects and novel features will be more fully apparent from the following detailed description when the same is read in connection with the accompanying drawing. It is to be expressly understood, however, that the drawing is for purposes of illustration only, and are not intended as a definition of the limits of the invention.

In the drawing wherein like reference characters refer to like parts throughout the several views, Figure 1 represents a schematic side-view partly in cross-section with parts broken out of one embodiment of the damper.

Figure 2 represents a cross-sectional side-view 2—2 partly in cross-section with parts broken out of Figure 1.

Figures 3 and 4 represent other embodiments of the damper in schematic side-views with parts broken out and partly in cross-section.

Figure 5 represents a cross-sectional side-view 5—5 partly in cross-section with parts broken out of Figure 4.

On Figure 1 a ball B is rigidly mounted on a shaft S by means of a key 20 for example. On ball B a wobble-plate W having a ball-bearing surface 21 in which the ball B is placed, is mounted, as shown on the figure. In the drawing, the wobbleplate is illustrated as one unit for purposes of simplicity. The provision of the wobble-plate for the damper is the essential feature of this invention.

The wobble-plate W as illustrated in Figure 1 is operatively interconnected with a lever L by interconnecting means C and D. Interconnecting means C is a pin P mounted between the raceways 23 provided in the wobble-plate W and raceways 24 provided in the lever L. The wobble-plate has a cut-out or aperture 25 to permit free but limited displacement of the lever L while oscillating relative to the pin P and the interconnecting means D.

Interconnecting means D may be a pin or an axle on which the lever L pivots. The pin D is supported on a member 26 which is rigidly affixed through the intermediary of member 27 to the shaft S.

The operation of this embodiment is very simple. Rotation of shaft S throws lever L by centrifugal force in the direction of the arrow 28. Simultaneously, the lever exercises pressure on the pin P through raceways 24 and acts on the wobble-plate through raceways 23. Simultaneously with the occurrence of a flexional disturbance of any nature in the shaft, such as, for instance, the sudden movement of the shaft in the direction of the arrow 29, the pin D moves in the direction of the arrow 30 and the weight M or the mass of the lever L (if no weight is provided) moves in the direction of the arrow 31 with a force greater than the centrifugal force above-mentioned. At this moment the wobble-plate turns to $a°$ as shown schematically in exaggerated dimensions, and is pushed out of balance. The great resistance set up by the gyroscopic effect of the wobble-plate will act as a restoring or dampening force against the disturbance engendered by the lever L. Proper calculation and design of the wobble-plate, the lever and the interconnecting means will provide the desired sensitivity of the device.

It is contemplated that the most important operation of the apparatus shown in Figs. 1 and 2 will involve damping of lateral vibratory movements of the shaft, whether the movement is caused by flexing of the shaft or otherwise. As the shaft moves upwardly in Fig. 1 the control mass M moves downwardly relative to the shaft about the pivot D and causes the weight W to be moved angularly from its normal plane of rotation by means of the connections shown. The mass of weight W and its resistance to angular or wobble movement will damp the shaft vibration.

Figure 3 shows the wobble-plate W provided with extensions 32, 33. The lever L and pin D are mounted on the extension 33. Pin P is mounted in the raceways 24 of the support 26 which is rigidly affixed to the shaft S.

To maintain the lever L in a desired position, resilient means 32' may be interposed between an appropriate part of the lever and the wobble-plate W as shown on Figure 3.

In Figure 4 the support 26 mounted rigidly on the shaft S is provided with a radial stud shaft 34 on which the member 35 is rotatably mounted with or without bearings 36, 37. Member 35 may rotate limitedly around the shaft 34. Member 35 is provided with raceway 38 corresponding to the raceway 23 on Figures 1 and 2. Pin P operatively interconnects member 35 with the lever L through raceway 39 corresponding to the raceway 24 of Figures 1 and 2.

A ball connection 40 is provided between the wobble-plate W and the arm 44 of the lever L. Tapered openings 43 are provided in the wobble-plate to permit universal relative movement. The wobble-plate can then oscillate at an angle $a_1$—$a_2$ with respect to the centre line 45. In operation lever L has universal pivotal movement.

Probably the most important damping action of the apparatus shown in Figs. 4 and 5 will be the same as that described for the apparatus of Fig. 1. In addition thereto the lever or mass L is capable of a pivotal movement about the radial axis indicated by the line 3—3 on Fig. 4. In response to torsional oscillations of the shaft which cause the axis 3—3 to move at a momentarily accelerated or decelerated velocity the lever or weight L will swing as a pendulum about the axis 3—3 and thus operate to dampen oscillatory vibration.

It will be understood that the description of particular modifications is illustrative and various modifications can be made without departing from the spirit of the invention as defined in the claims.

Having now ascertained and particularly described the nature of this invention and the manner in which it is to be performed, I declare that what I claim is:

1. In a vibration damping apparatus of the character described the combination with a shaft of an inertia mass rotatable normally in a predetermined plane but capable of angular movement transverse to that plane, control masses pivotally supported on opposite sides of the shaft to rotate therewith and movable pivotally in response to lateral movements of the shaft, and connections between the control masses and the inertia mass to cause transverse angular movement of the inertia mass in response to pivotal movements of the control masses.

2. In a vibration damping apparatus the combination with a shaft of an inertia mass rotatable normally in a predetermined plane but capable of angular movement transversely of that plane, mutually balanced control masses rotatable with the shaft and capable of movement relative to the shaft in response to lateral movements of the shaft, and connections between the control masses and the inertia mass to cause transverse angular movement of the inertia mass in response to pivotal movements of the control masses whereby lateral vibratory movements of the shaft are opposed by the inertia of the rotatable inertia mass.

3. A vibration damping apparatus as defined in claim 2 wherein the control mass is also movable about a radial axis to damp torsional vibrations of the shaft.

4. A vibration damping apparatus comprising in combination a rotatable inertia mass capable of an oscillatory movement in addition to its movement of rotation, a plurality of control masses in balanced relation to each other rotatable about the same axis as the inertia mass, each of said control masses constituting a pendulum having a component movement about an axis transverse to the axis of rotation and a second component movement about a radial axis, and a connection between the control masses and the inertia mass whereby movement of the control mass about the transverse axis causes movement of the inertia mass.

GEORGE A. RUBISSOW.